United States Patent
Schmidt et al.

[11] Patent Number: 5,176,342
[45] Date of Patent: Jan. 5, 1993

[54] GOGGLES EMERGENCY RELEASE APPARATUS

[75] Inventors: Daniel J. Schmidt, Yardley, Pa.; Thomas J. Dillon, Sutton, W. Va.; Ricky L. Greth, Flemington, N.J.

[73] Assignee: The United States of America as represented by the Secretary of the Navy, Washington, D.C.

[21] Appl. No.: 815,294

[22] Filed: Dec. 30, 1991

[51] Int. Cl.⁵ .......................................... B64D 25/115
[52] U.S. Cl. ...................... 244/122 AE; 244/122 AG; 244/121; 2/6; 2/422; 33/262
[58] Field of Search ......... 244/122 AE, 121, 122 AG, 244/122 A, 122 AH; 2/6, 422; 33/262, 252, 263

[56] References Cited

U.S. PATENT DOCUMENTS

| 4,651,951 | 3/1987 | McFarlane | 244/122 AG |
| 4,670,912 | 6/1987 | Hart | 2/209.1 |
| 4,689,834 | 9/1987 | McCarthy et al. | 2/6 |
| 4,697,783 | 10/1987 | Kastendieck et al. | 2/6 |
| 4,703,879 | 11/1987 | Kastendieck et al. | 2/6 |
| 4,734,939 | 4/1988 | Copp | 2/6 |
| 4,907,296 | 3/1990 | Blecha | 2/6 |

FOREIGN PATENT DOCUMENTS

| 2168595 | 6/1986 | United Kingdom | 2/6 |
| 2179543 | 3/1987 | United Kingdom | 2/6 |

Primary Examiner—Joseph F. Peters, Jr.
Assistant Examiner—Anne E. Bidwell
Attorney, Agent, or Firm—James V. Tura; James B. Bechtel; Susan E. Verona

[57] ABSTRACT

A goggles emergency release apparatus is disclosed wherein an actuator, positioned adjacent the goggles latching mechanism, drives a wedge into the mechanism to push a release pin into the open position and push the goggles away from the helmet. The actuator receives its initiation power when the ejection seat movement closes a microswitch.

11 Claims, 3 Drawing Sheets

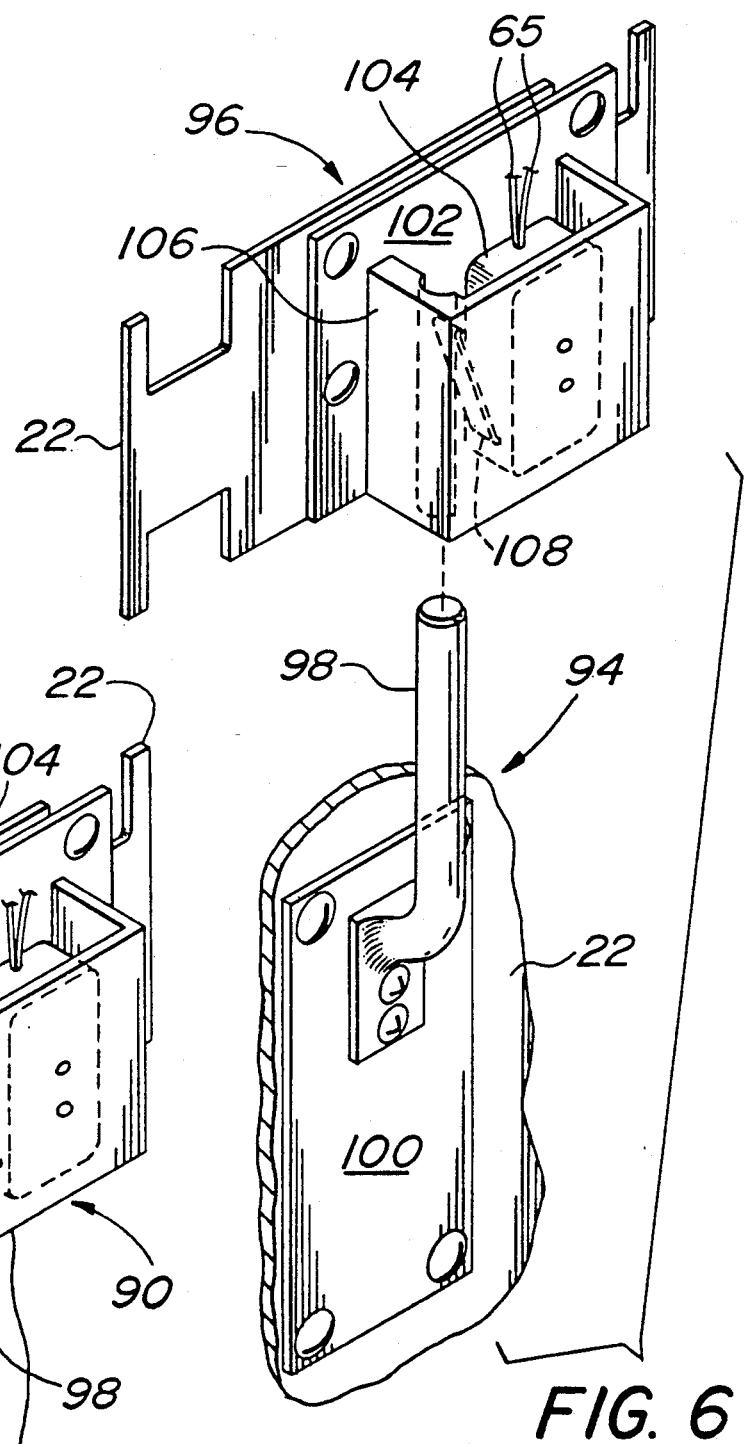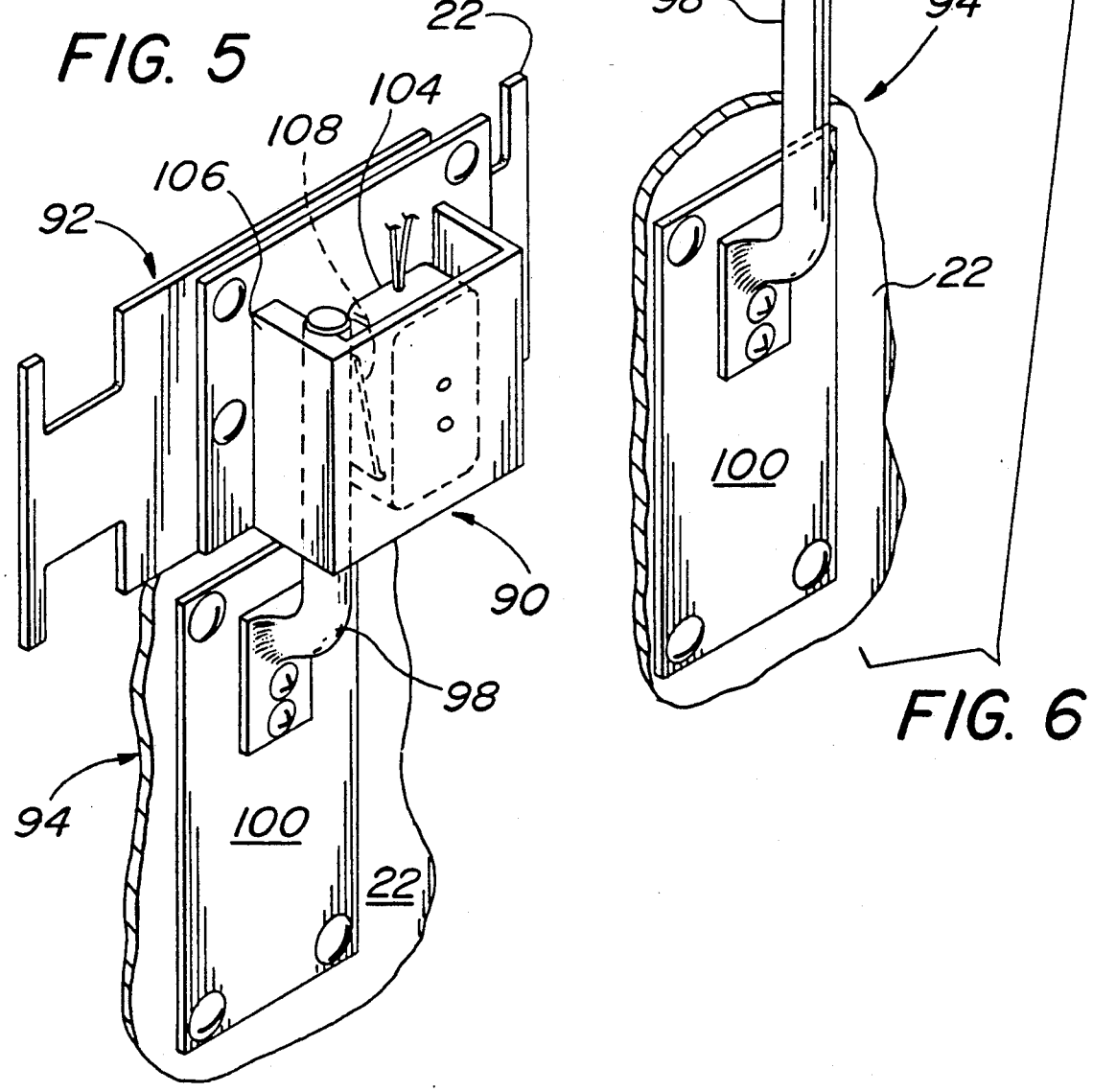

GOGGLES EMERGENCY RELEASE APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Pilots flying modern, high-speed jet aircraft have recently been introduced to a sophisticated component that greatly expands their capabilities: night vision goggles. This is an instrument that attaches to the shell of a pilot's helmet and positions Image Intensifiention Tubes ($I^2$ tubes) in front of his eyes to give him a limited view, that was not present before, of a nightime battlefield.

The various brands of goggles, and associated parts and components, usually consist of individual left and right eye pieces, an adjustable framework, an electronics package and a latching mechanism. The whole device normally weighs about 2 pounds and is built to be attached to a channelled rampway by a bar-actuated release latch. The latch uses double flanges to hook underneath separate pins built into the rampway and allows the goggles to hang off the top of the pilot's helmet and in front of his eyes. The goggles are built to be manually attached and removed by use of the latching mechanism. To attach the goggles, the pilot guides the front and back flanges into locking engagement with the front and back pins in the rampway. To remove the goggles, the pilot must lift up on a spring-biased release bar, which removes locking pressure from between the flanges and the pins, and then slide the goggles forward away from the rampway. Normally, pilots do not fly their whole mission with the goggles in place, but rather install and remove them at appropriate times.

While the above-described latching mechanism is suitable for normal missions, it introduces a severe danger to pilot safety whenever an emergency arises during goggle use. If such an in-flight emergency occurs and the pilot must eject from the aircraft while the goggles are attached to the helmet and supported by the pilot's neck, the sudden acceleration of the ejection seat coupled with the offset center of gravity of the goggles will cause severe, even fatal, neck injury. Until the instant invention, there was no means to automatically separate the goggles from the pilot prior to ejection.

SUMMARY OF THE INVENTION

Accordingly, it is an object of the present invention to provide a goggles emergency release apparatus that will automatically release a set of night vision goggles from a pilot's helmet upon the occurrence of an ejection from the aircraft.

It is a further object of the present invention to provide such an emergency release apparatus that is activated by the first movement of the ejection seat during an ejection situation.

It is a still further object of the present invention to provide such an emergency release apparatus that will exert sufficient pressure on a goggles latching mechanism that the spring-loaded latching pin will release.

It is a still further object of the present invention to provide such an emergency release apparatus that will, after latching pin release, forcibly move the latching mechanism and goggle assembly away from the helmet.

These and other objects and many attendant advantages of the present invention are obtained where a bellows actuator is positioned to drive a wedge under a spring-loaded release pin in a night vision goggles latching mechanism, to force a release thereof from a pilot's helmet. A microswitch, attached to the aircraft ejection seat, is closed as soon as the seat starts to move and transfers actuation energy to the actuator. The actuator drives a wedge forward, under and into the latching mechanism.

The novel features which are believed to be characteristics of the invention, both as to its organization and methods of operation, together with further objects and advantages thereof, will be better understood from the following descriptions in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

FIG. 5 shows an isolated perspective view of the separation mechanism of the detachment system in the joined position; and FIG. 6 shows a view similar to FIG. 5 but with the separation mechanism in the opened position.

DETAILED DESCRIPTION OF THE PREFERRED EMBODIMENT

Figure 1:
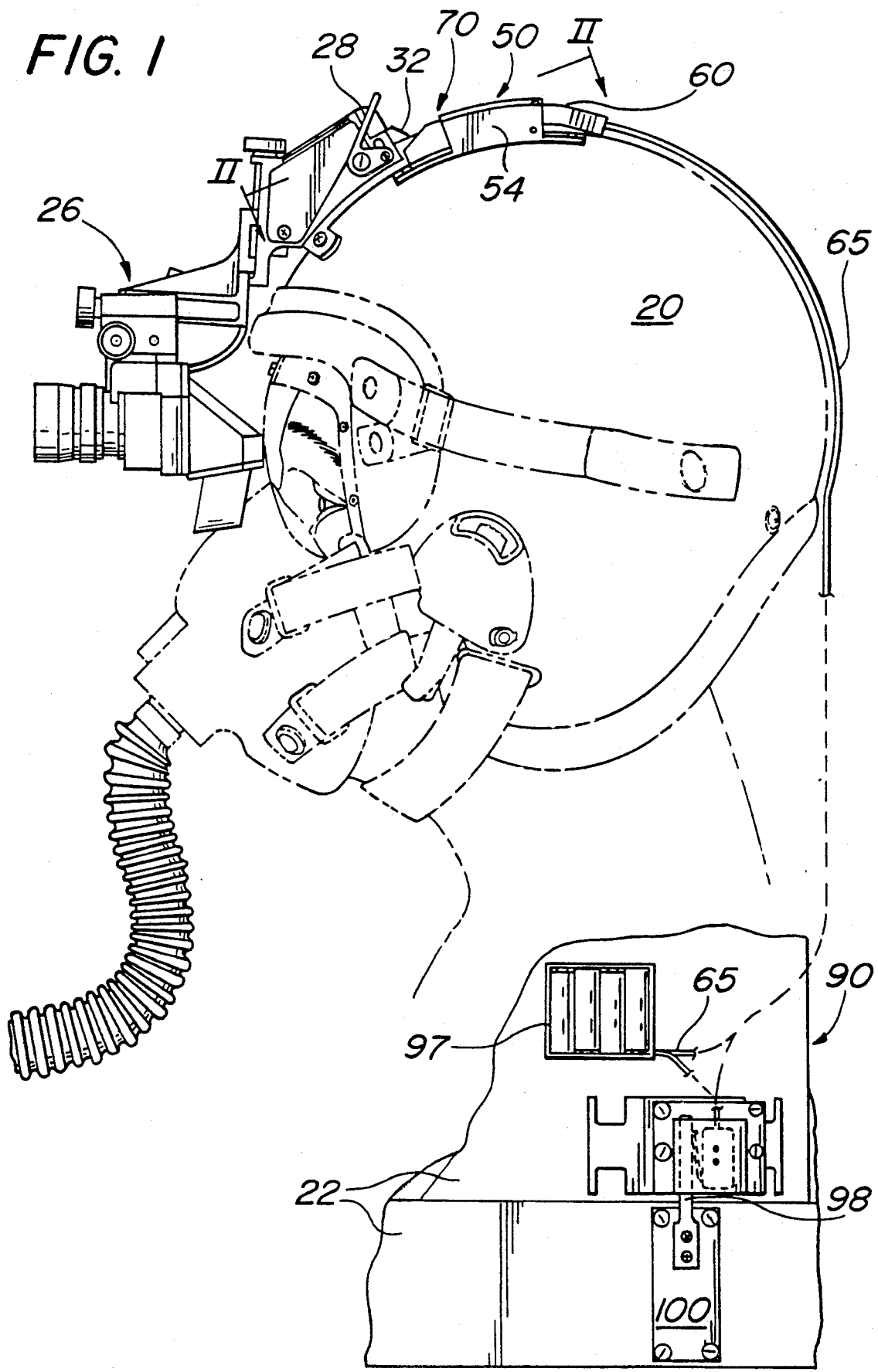
FIG. 1 shows an elevation view of the goggles emergency release apparatus as installed on a pilot's helmet and as attached to the aircraft ejection seat.

Referring now to the drawings, wherein like reference characters designate like or corresponding parts throughout the several views, there is illustrated in FIG. 1 an elevation view of the goggles emergency detachment system as installed on a pilot's helmet 20 and as attached to the aircraft ejection seat 22. A night vision goggles 26 is held in front of the pilot's face and eyes by a goggles latching mechanism 28. Latching mechanism 28 is removably fastened into a dual-pin, channel base 36 (seen more clearly in FIGS. 2 and 3) and is comprised of a dual-hook, release-bar actuated latch, as will be explained more fully below. The goggles emergency detachment system is comprised of, in general terms, a base means 50, an actuator means 60, a release means 70 and an initiator means 90. Further description of each of these individual parts as well as explanation as to their operation and cooperation follows.

Figure 2:
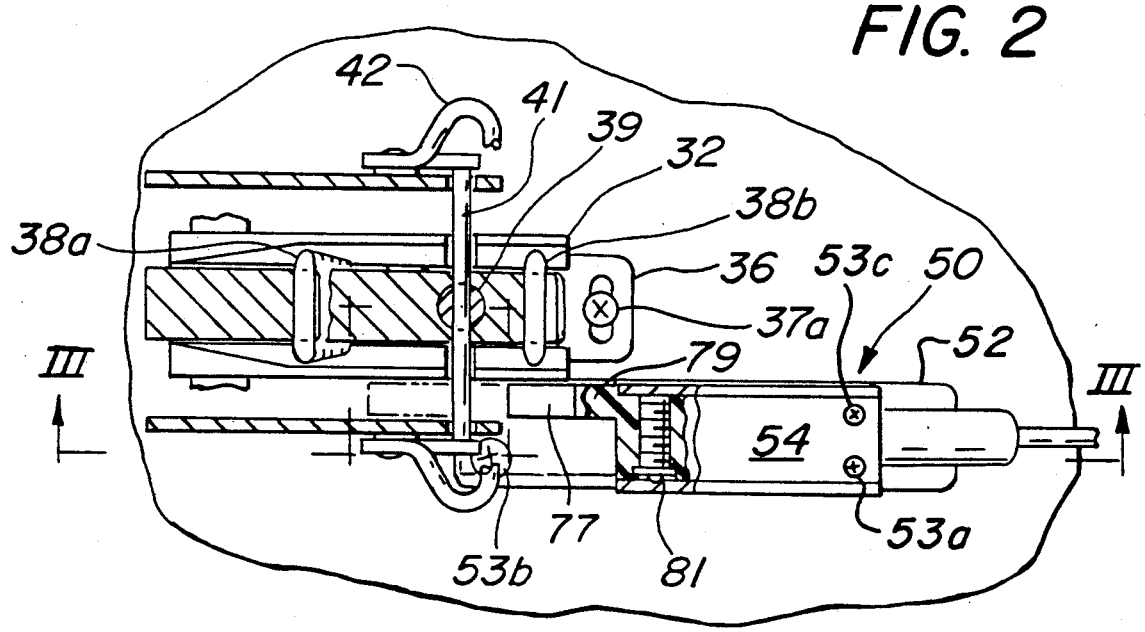
FIG. 2 shows a plan view of the goggles emergency release apparatus as taken along lines II—II of FIG. 1.
Figure 3:
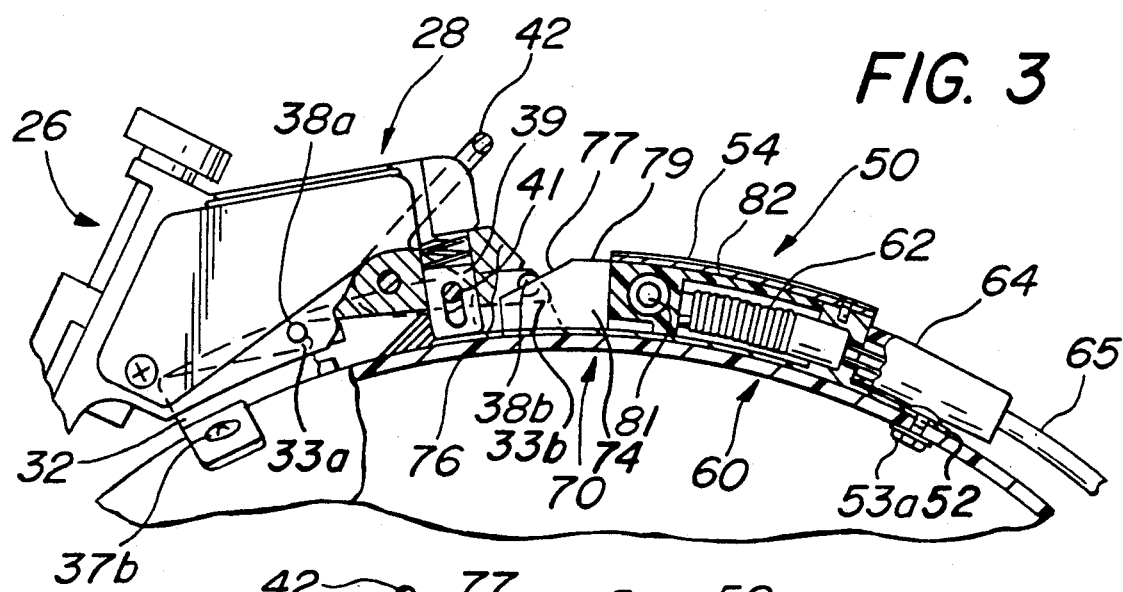
FIG. 3 shows an elevation view of the goggle emergency release apparatus as taken along lines III—III of FIG. 2.

FIG. 2 shows a plan view of the goggle emergency detachment system as taken along lines II—II of FIG. 1 and FIG. 3 shows an elevation view of the goggle emergency detachment system as taken along lines III—III of FIG. 2. Goggles latching mechanism 28 as attached to night vision goggles 26 by means known in the art, provides a mechanism that properly and securely attaches the goggles to the pilot's helmet 20 at a predetermined location to position goggles 26 in front of his eyes. Mechanism 28, which comprises a dual-hook, release-bar actuated latch 32 and a dual-pin channel base 36, provides a spring-biased snap fit between latch 32 and channel base 36. Channel base 36 is fixed to the outer surface of the top of helmet 20 by screws 37a,b,c (only 37a shown in FIG. 2) or other fasteners known in the art. The front and rear hooks 33a and b (with reference to the front of the helmet being at the left side of the drawing and the rear of the helmet being at the rightside) of latch 32, upon goggles attachment, slide underneath and engage front and rear pins 38a and b, respectively, captured at prespecified locations within the channel of channel base 36. Adjacent rear hook 33b is a spring-biased cylinder 39 attached by a pin 41 to a pivoting release bar 42. To disengage the goggles, the pilot would have to manually lift up on release bar 42, thereby relieving pressure from cylinder 39. Once pressure is released from cylinder 39, the pilot would then have to back the dual hooks of the goggles and latching mechanism out of engagement with their pins to completely disconnect the apparatus. Goggles 26 and latching mechanism 28 weigh between 1.5 and 2 pounds and most of this weight is concentrated at the end of a moment arm of approximately six inches from the pilot's head c.g. This weight and moment arm hanging from a pilot's head, combined with an ejection seat thrust of 14 g's (where 1 g is equivalent to one times the force of gravity), make it extremely dangerous for the pilot to eject from his aircraft with the goggles attached. Unfortunately, there isn't time, nor inclination, for the pilot to detach the goggles when he's trying to make an emergency exit from the aircraft.

Base means 50, comprising an anchor plate 52 and a tubular housing 54, (both made from aluminum) connected thereto, is positioned adjacent channel base 36 and securely affixed to the outer top surface of helmet 20 as by screws 53a,b and c, or other fastening means known in the art. Housing 54 is a tubular structure of predetermined length that can have a square- or rectangular-shaped cross-sectional outline, such as shown, or a circular cross-sectional outline. Only the front end of housing 54 is unobstructed, as will be described below.

Figure 4:
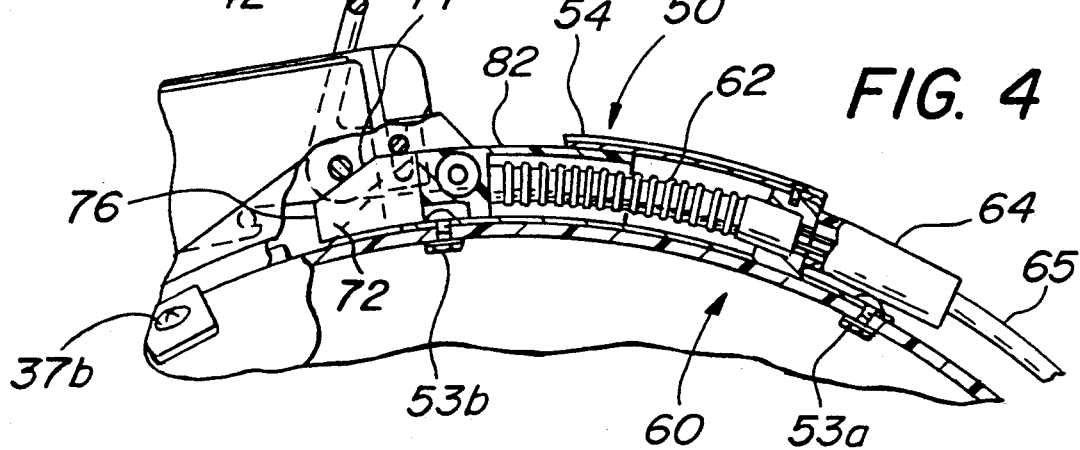
FIG. 4 shows a view similar to that of FIG. 3 except that the bellows has expanded to push the wedge under the release bar's locking pin.

Actuator means 60 sits mostly inside housing 54 and comprises a bellows-type ballistic actuator 62, such as those made by the IRECO Incorporated Company, a ferrite choke 64 to provide proper shielding to actuator 62, and power transmission cable 65. Cable 65 is connected into the rear end of actuator 62 and extends through a small aperature in the rear end of housing 54 to the initiator means 90. Actuator 62, upon receiving a proper electrical signal, expands (as seen in FIG. 4) with approximately 20 pounds of force.

Release means 70 can be formed from hi-strength, machined plastic and has a forward outwardly projecting section 72 and an inner rear section 74. Front section 72 has a lead, front edge 76 of a predetermined height and thickness, an angled, or sloped, surface 77, to form a wedge-shaped block, and a full-size portion 79 that becomes widened out of the juncture of front and rear sections. Rear section 74 includes a spring-biased ball 81 and a substantially hollow or shell portion 82. Hollow portion 82 is sized to provide an enclosure around actuator 62 for a purpose to be described. Release means 70 is sized to slip-fit inside the inner walls of housing 54, with an identical outer shape, except that under most conditions, ball 81 is urged into a slight detent in the inner wall, to act as a retainer at a predetermined location, to maintain release means 70 snug against the front end of actuator 62 until moved by a sufficient amount of force.

FIGS. 5 and 6 show perspective views of initiator means 90, FIG. 5 showing means 90 in the closed position and FIG. 6 showing means 90 just after the ejection sequence has been started. Initiator means 90 comprises a separation mechanism 92 that uses a stationary portion 94 and a movable portion 96 and an energy source, such as battery pack 97. Stationary portion 94 has a straight, rigid pin 98 made of stainless steel fastened to a base plate 100, which, in turn, is fastened to the stationary part of ejection seat 22. Movable portion 96 includes a base plate 102, securely fastened to the movable part of seat 22, a microswitch 104, similar to switches made according to MILSPEC MIL-S-8805/46C, and a three-sided housing 106 that is fixedly attached to base plate 102 at a predetermined location, as will be explained. Base plates 100 and 102 and housing 106 can be made of either aluminum or plastic and are fastened to contiguous surfaces by means known in the art.

As shown in outline in FIGS. 5 and 6, microswitch 104 carries a movable lever arm 108. Arm 108 is spring-biased to be in the open position (FIG. 6) and housing 106 is fixed adjacent to switch 104 such that whenever pin 98 is inserted inside the corner thereof, it pushes against arm 108 to move it to a closed position. This occurs at all times that the movable part of seat 22 is adjacent to the stationary part of seat 22. Whenever arm 108 is in the closed position, (FIG. 5), switch 104 is in an "off" or non-transmitting mode, and whenever the arm is in an open position, (FIG. 6), switch 104 is in an "on" or transmitting mode.

Operation

The goggles emergency release apparatus is designed to physically and instantaneously separate an attached set of goggles from a pilot's helmet whenever there is ejection seat separation, as in an emergency. The pilot will initiate the ejection seat firing sequence, as for example by pulling on the seat handles, and seat separation will commence. As soon as the distance between parts 94 and 96 is sufficiently large to have pin 98 withdraw from adjacent switch 104, arm 108 will extend, thus turning-on switch 104 and allowing power to flow from battery pack 97 up cable 65 to actuator 62 (see FIG. 3). Actuator 62 fires and forces release means 70 forward, along a guide formed by plate 52, into rear pin 38b. Front section 72 has a lead edge 76 sized appropriately so that it is guided under rear pin 38b to allow surface 77 to make contact therewith. As front section 72 continues forward, the slope of surface 77 lifts pin 38b up, as though release bar 42 were being lifted up, thereby taking pressure off of rear hook 33b. Front section 72 will now continue forward pushing latching mechanism 28 and goggles 26 away from helmet 20, leaving the pilot free to continue his egress unimpeded.

Finally, while the goggles emergency release apparatus has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

What we claim is:

1. A goggles emergency release apparatus for forcibly separating goggles latched to a pilot's helmet when a pilot ejects from his aircraft, comprising:

base means attached to the top of the helmet to provide a housing and a guiding track adjacent to a goggles latching pin;

actuator means situated in said housing;

release means having a forward section with a sloped front surface in a first position adjacent said actuator means and slidably situated to move from said first position apart from the latching pin to a second position impacting the pin; and initiator means connected to said actuator means and the pilot's ejection seat to provide a signal to said actuator means, whereupon said actuator means forces said release means to impact the latching pin separating it from the helmet and moving the goggles away from the helmet.

2. A goggles release apparatus as described in claim 1 wherein said base means is a tube.

3. A goggles release apparatus as described in claim 1 wherein said actuator means is a ballistic actuator that generates approximately twenty pounds of pressure.

4. A goggles release apparatus as described in claim 3 wherein said ballistic actuator is a bellows actuator.

5. A goggles release apparatus as described in claim 1 wherein said release means has a rear section containing a retaining means extending from a side surface.

6. A goggles release apparatus as described in claim 5 wherein said release means comprises a shell portion at the rear section.

7. A goggles release apparatus as described in claim 1 wherein said initiator means comprises a separation means connected to stationary and moving sections, respectively, of the ejection seat.

8. A goggles release apparatus as described in claim 7 wherein said separation means includes a rigid pin fixedly attached to the stationary section.

9. A goggles release apparatus as described in claim 8 wherein said separation means comprises a microswitch connected to an energy source and fixedly attached to the moving section.

10. A goggles release apparatus as described in claim 9 wherein said microswitch contains a lever arm held in a first, closed position by said rigid pin and movable to a second, open position once said pin is removed.

11. A goggles release apparatus for forcibly separating latched goggles from a pilot's helmet when the pilot actuates his ejection seat, comprising:

an anchor plate fixedly attached to a predetermined location on the helmet adjacent a goggles latching mechanism;

a tubular housing situated on and fixedly attached to said anchor plate;

a wedge-shaped block located inside a first end of said housing and connected to impact underneath a latching pin;

a ballistic actuator located inside a second end of said housing and adjacent said block;

an energy source; and switching means connected to movable and stationary sections of the ejection seat and said energy source to transmit a signal to said actuator upon separation of said movable and stationary sections.

* * * * *